United States Patent [19]

Gutknecht et al.

[11] 3,851,379

[45] Dec. 3, 1974

[54] SOLID STATE COMPONENTS

[75] Inventors: Peter Gutknecht, Santa Ana, Calif.; Terrence M. S. Heng; Harvey C. Nathanson, both of Pittsburgh, Pa.

[73] Assignee: Westinghouse Electric Corporation, Pittsburgh, Pa.

[22] Filed: May 16, 1973

[21] Appl. No.: 360,996

[52] U.S. Cl. .......................... 29/571, 29/579, 29/580

[51] Int. Cl. .......................... B01j 17/00

[58] Field of Search .............. 29/571, 578, 579, 580

[56] References Cited

UNITED STATES PATENTS

| | | | |
|---|---|---|---|
| 2,875,505 | 3/1959 | Pfann | 29/580 |
| 3,387,360 | 6/1968 | Nakamura | 29/580 |
| 3,689,993 | 9/1972 | Tolar | 29/580 |
| 3,761,785 | 9/1973 | Pruniaux | 29/578 |

*Primary Examiner*—Roy Lake
*Assistant Examiner*—W. C. Tupman
*Attorney, Agent, or Firm*—J. B. Hinson

[57] ABSTRACT

There is disclosed a method of making a metal-oxide silicon field-effect transistor (MOSFET) capable of delivering substantial power (5 to 10 watts) in the microwave frequency range (about 5 Gigahertz) and operating as an amplifier over a wide bandwidth through a reasonably high input impedance exceeding about 5 ohms. The method is practiced with a layered blank of silicon having, say, an N+ substrate on which is a P-layer; there is a second N+ layer on the P-layer. Regions, each having a surface for deposit of a drain, are prepared on the second layer. Grooves are etched undercutting these regions so that they overhang the grooves. The gate and drain electrodes are deposited simultaneously by linear beams of vapor at supplementary angles to the prepared surfaces. The angles and the length of the overhangs are such that the gate electrodes extend only along the projections of the edges of the contiguous P-layers which extend along the groove, minimizing the capacitance between the gate electrode and the other electrodes.

There is also disclosed a MOSFET produced in the practice of this invention.

9 Claims, 45 Drawing Figures

SOLID STATE COMPONENTS

REFERENCE TO RELATED DOCUMENTS

1. F. Hochberg and L. M. Terman — *Fabrication of MOS Devices with Close Source-Drain Spacing* IBM Technical Bulletin Vol. 10, No. 5, p. 653 — Oct. 5, 1967.

2. U.S. Pat. — Kazan 3,384,792 dated May 21, 1968.

3. Y. Tarui, Y. Hayashi, T. Segigawa — *Japanese Take Two Steps Forward in MOS-Display Compatibility* — Electronics International — Oct. 13, 1969 — pp. 207–209.

4. S. Magdo and I. Magdo — *High Speed Epitaxial Field-Effect Devices* — IBM Technical Disclosure Bulletin, Vol. 14,, No. 3, August 1971, p. 751

5. U.S. Pat. Das No. 3,586,930 dated June 22, 1971.

6. W. Baechtold and P. Wolf; *Solid State Electronics*, Vol. 14, No. 9, Sept. 1971, pp. 783–790.

7. H. J. Sigg, G. D. Vendelin, T. P. Cauge, and J. Kocsis; *IEEE Trans. Electron Devices*, Vol. ED–19, pp. 45–53, Jan. 1972.

8. F. F. Fang and B. L. Crowder; *Int. Electron Devices Meeting*, Washington, D.C. Oct. 1970.

9. S. Teszner; *IEEE Trans. Electron Devices*, Vol. ED–19, pp. 355–364, March 1972.

10. H. Sobol and F. Sterzer, *IEEE Spectrum*, Vol. 9, pp. 20–33, April 1972.

BACKGROUND OF THE INVENTION

This invention relates to the solid-state art and has particular relationship to field-effect transistors (FET). It is an object of this invention to provide a low-cost microwave power transistor which shall avail wide bandwidth amplifications particularly for radar and related apparatus. This object would be met typically by a transistor which delivers 5 to 10 watts output power at a frequency of 5 Gigahertz (GHZ) and has wide bandwidth amplification when operated through an input impedance exceeding about 5 ohms. This data is presented only in the interest of concreteness to aid those skilled in the art in practicing this invention and not with any intention of limiting this invention in any way.

A field-effect transistor includes a source, a drain and a gate which controls current flow between the source and the drain. An insulator or a barrier (Schottky) to flow of current is interposed between the source and drain and the gate. The insulation betwen the insulator may be an oxide of the material which serves for the transfer of current. Typically for a silicon FET the insulator may be silicon dioxide. The transistor is referred to as a metal-oxide silicon field-effect transistor MOSFET. To control the current flow between the source and drain a potential is impressed between the gate and the source. The source and drain may be spaced on a substrate and the current may flow between these electrodes across the surface of the substrate. Alternatively the source and drain may be disposed in overlying layers and the current between them may flow through the layers. Such FET's are described as having "vertical" conduction channels. "Vertical" FET's have the advantage that they have a high fabrication yield; that is, many (an optimum of) transistors can be fabricated on a small chip area because the sources and drain extend upwardly from the chip rather than along the chip viewing the chip in a horizontal position.

In accordance with the teachings of the prior art as disclosed by References 1 through 10, silicon field-effect transistors have been proposed as small-input-signal, high-gain, microwave amplifiers. Typically, Reference 6 discloses a Schottky-barrier silicon FET having 5 db gain at 7 GHZ; Reference 7 discloses a silicon FET, whose electrodes are formed by a combination of epitaxial growth and vertical difussion, which is capable of operating at frequencies up to 10 GHZ. Reference 8 discloses a MOSFET, utilizing ion implantation, which is capable of operating at frequencies up to 12 GHZ. The FET's disclosed in References 6, 7, 8 are all small-input-signal devices having a maximum power output of only a few tens of milliwatts. However, Reference 9 discloses an FET having a diffused P grid embedded in an N-epitaxial drift region with which 5 watts of power, but only at 0.1 GHZ, is achieved. The minus or plus sign above the N refers to the quantity of negatively charged carriers in the material. N−− means a small number of carriers, N+ a large number and N++ a very large number. A review of the prior art listed above and related prior art reveals that there is not in this art a microwave transistor capable of delivering substantial power at high frequencies which is at the same time low in parasitics, of small chip areas and has a high fabrication yield.

It is an object of this invention to overcome the above-described disadvantages of the prior art and to provide a transistor capable of delivering substantial power, at least 5 to 10 watts, at high frequencies, at least 5 GHZ. It is an object of this invention to provide such a transistor which shall have low parasitics, a small chip area and a high fabrication yield.

SUMMARY OF THE INVENTION

This invention arises from the realization that the high interelectrode capacitance and resistance of the prior-art transistors, particularly of the "vertical" conduction type, constitutes a serious obstacle to the provision of a high-power, high-frequency transistor while achieving economy in the use of wafers or slices. Typically it has been realized that the embedded P grid of the transistor disclosed in Reference 9 has a high series resistance and a high capacitance to the drain and that these severely limit the frequency at which power operation can take place.

In accordance with this invention the interelectrode capacitance and resistance and parasitics are minimized by localizing the gate over a small area adjacent the source. The localization is achieved by projecting a linear beam of vapor and shading the beam so that only a narrow gate strip near the source is solidified. The transistor is formed from a blank including a substrate of a semiconductor doped with carriers of one polarity on which there is a first layer of a semiconductor doped with carriers of the opposite polarity. On the first layer there is a second semiconductor layer doped with carriers of the first polarity and having thereon regions coated with insulators. The blank is etched from the second layer down to the substrate to form a groove between successive regions with the regions overhanging the groove. Each region is layered as described with the ends of the first and second layers extending along the groove. The surface of the second layer of at least one region is prepared to form a drain (or alternatively source) electrode. The first layer under the surface serves as source (or alternatively drain). An insulating coating is deposited on the surface of the groove and a linear stream of metal vapor is projected at an angle to the prepared surface so that it impinges and is solidified under the overhang of the region of this surface. The length of the overhangs of the regions and the angle are such that the shadowing of the beam by the overhangs permits metal to be deposited substantially only on the part of the insulator opposite the end of the first layer whice serves as source electrode. The deposit serves as gate. The beam may be of such cross-sectional area as to deposit the drain electrode simultaneously with the ate. Because the gate is localized oppositely to the end of the source the gate-source capacitance and parasitics are minimized In the usual practice of this invention a plurality of FETs are produced on a layered slice of doped semiconductor. Each FET, consisting of a plurality of transistors in parallel, is formed of a plurality of regions with the surface of each region coated with an insulator and prepared for deposit of a drain electrode and with grooves, coated with insulator, between, and undercutting, successive regions. A linear beam of metal vapor is projected at an angle to the slice impinging on the whole outer surface of the slice. The beam deposits the drain electrodes and the drain terminal or pad for each transistor module or element and also the narrow gates and the gate terminal or pad for the one side of each module away from the direction of the beam. The linear beam of vapor is then projected on the slice at the supplementary angle depositing additional metal on the drains of the modules to improve conductivity and also the narrow gates of the remaining sides of the modules away from the new beam. Several thousand FETs can be produced on a slide of semiconductor of one square inch area.

BRIEF DESCRIPTION OF THE DRAWING

For a better understanding of this invention, both as to its organization and as to its method of operation, together with additional objects and advantages thereof, reference is made to the following description taken in connection with the accompanying drawings, in which.

DETAILED DESCRIPTION OF INVENTION

Figure 2A:
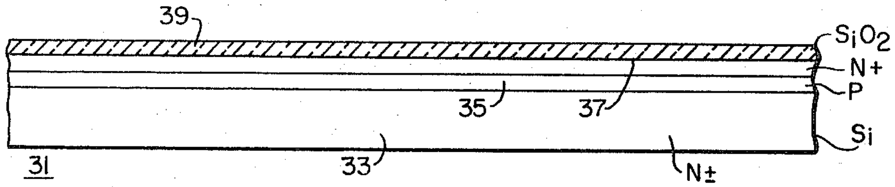
FIGS. 2A, B, C, D, E, F, G, H and I are fragmental sectional views of a part of a layered slice enlarged illustrating the successive steps in the practice of the invention.

The transistors are produced according to this invention from layered blanks or slices or wafers 31 (FIG. 2A) of a semiconductor. In the interest of concreteness the blank may be assumed to be an epitaxial N+/P/N+ blank consisting of a substrate 33 of silicon doped with N± carriers, having thereon a first layer 35 of silicon doped with P carriers. On the first layer 35 there is a second layer 37 of silicon doped with N+ carriers. The blank is oxidized so that the second layer 37 has a thick coating 39 of silicon dioxide $SiO_2$. During the oxidizing process which produces the coating the whole blank is coated but the $Sio_2$ is removed from all but the desired are during later processing. Typically, the blank 31 may be a circular disk about 1 square inch in area.

Figure 3A:
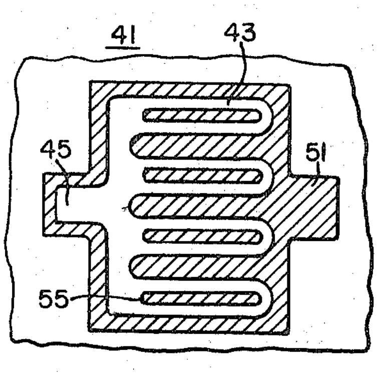
FIGS. 3A, B, C are plan views of the masks used on the slice in the practice of this invention.
Figure 3B:
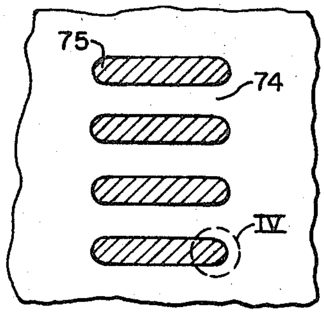
Figure 3C:
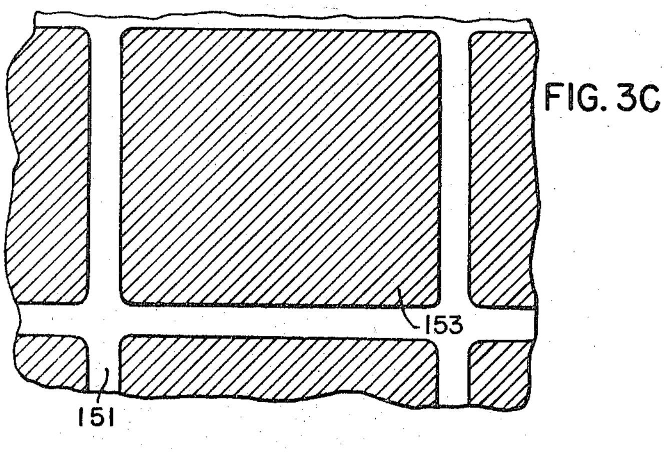
Figure 4:
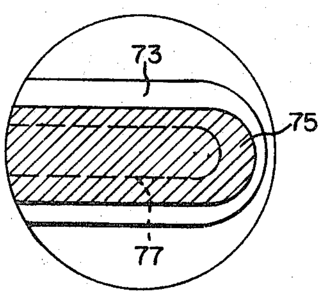
FIG. 4 is a plan view, enlarged, of the part of the mask shown in circle IV of FIG. 3 in masking position.

The blank 31 is in the practice of this invention subjected to photolithographic processing under the masks shown in FIG. 3. In this view the opaque areas of each mask are sectioned and the transparent areas unsectioned.

The first step is to subject the $SiO_2$ coating to a photolithographic process under masks 41 shown in FIG. 3A. Mask 41 is representative of a number of like masks on one transparency to which the whole blank 31 is subjected. The mask 41 includes a plurality of transparent fingers 43 extending from a transparent area similar to the surface of a hand having a projection 45, which delineates the drain tab D of the transistor, into an opaque area which has a projection 51 that delineates the gate tab G. Within each finger there is an opaque slot 55. FIG. 3A shows only four fingers 43 in the interest of clarity; typically there may be between 10 and 20 fingers. A large mask in the form of FIG. 3A is originally produced. This mask is reduced to the desired dimensions typically of about 0.01 inch by 0.01 inch by several steps of reducing photography. During the last photographic step, the object mask is moved in both dimensions so that an appropriate number of masks 41 are produced on the transparency.

Figure 1:
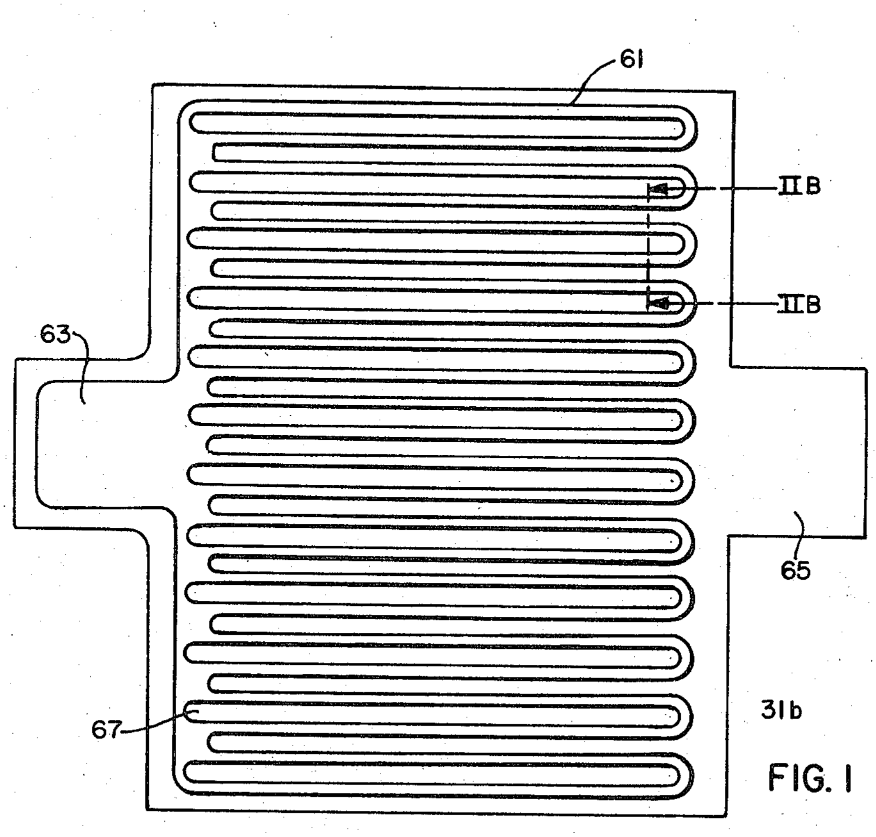
FIG. 1 is a plan view of a blank or layered slice or wafer which has been subjected to the first processing step, after oxidation, in the practice of this invention.
Figure 2B:
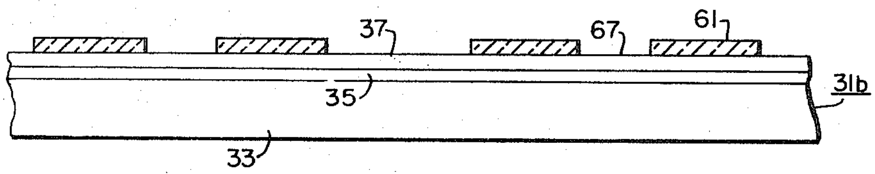
FIG. 2B being a section taken along line IIB—IIB of FIG. 1.

After blank 31 is subjected to the photolithographic process, it has the form of blank 31*b* shown in FIGS. 1 and 2B. The thick layer of $SiO_2$ around the unmasked parts of blank 31 being exposed is removed. In blank 31*b* the coating 39 is converted into a plurality of oxide fingers 61 extending from an oxide area from which projection 63 extends. The fingers 61 and projection 63 extend out from exposed portions 65 of the second layer 37. In addition, there are slots 67 of exposed second layer within the fingers 61.

Figure 2C:
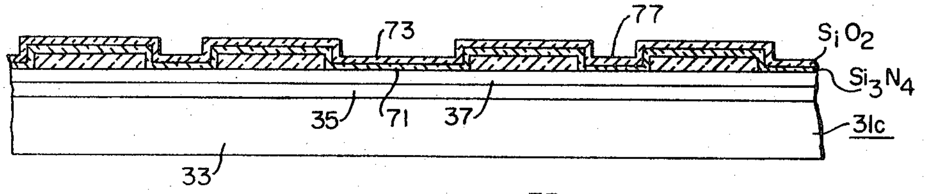

In step 2 the blank 31*b* is coated with silicon nitride $Si_3N_4$ and then the nitride is coated with $SiO_2$. The blank 31C shown in FIG. 2C is thus produced from blank 31*b*. Blank 31*c* has over the whole second layer 37 a coating 71 of $Si_3N_4$ over which there is a coating 73 of $SiO_2$.

Figure 2D:
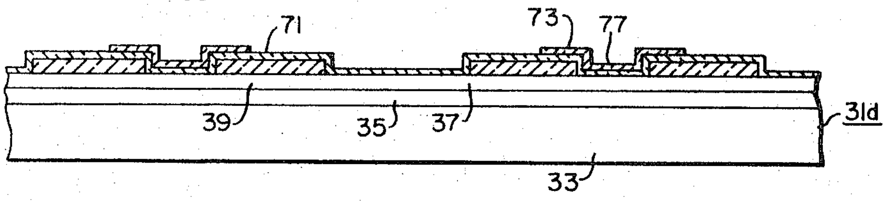

In step 3 a photolithograph is produced with the transparency 74 including the masks 75 on the blank 31*c*. The masks 75 cover the regions or slots 77 between the raised areas 71 and 73 of the $Si_3N_4$ and $SiO_2$ to delineate the pattern. The $SiO_2$ is then etched. Blank 31*d* (FIG. 2D) is thus produced from blank 31*c*.

Figure 2E:
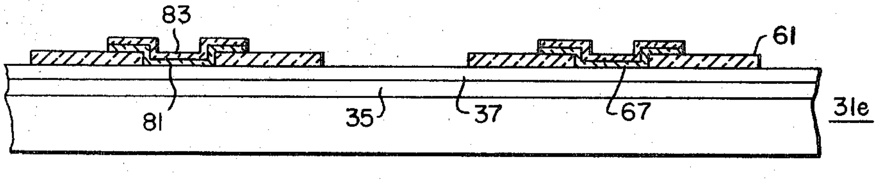

In step 4 the $Si_3N_4$ is etched. Blank 31*e* (FIG. 2E) is thus produced from blank 31*d*. In blank 31*e*, the fingers 61 are exposed except near the slots 67 where the regions 67 between the fingers 61 and the adjacent parts of the fingers are covered by a coating 81 of $Si_3N_4$ over which there is a coating 83 of $SiO_2$. The drain electrodes are electrically connected to the second layer 37 at slot 67 and it is essential that the surface of this slot 67 be protected against etching and during the subsequent oxidation of the silicon. The $Si_3N_4$-$SiO_2$ layers protect the slots 67.

In step 5 the silicon is etched down to the substrate and the $SiO_2$ is etched from the $Si_3N_4$. This etching only reduces the thickness of the oxide fingers 61 by a small magnitude but removes the $SiO_2$ 73 from the $Si_3N_4$ 71 in the slots 67 because the $SiO_2$, coating 73 (FIG. 2E) over the $Si_3N_4$ is very thin. Then the blank is oxidized so that the surfaces of the etched grooves 91 have a coating 93 of $SiO_3$. The areas of $Si_3N_4$ are not coated with oxide. Blank 31*f* (FIG. 2F) is produced from blank 31*e*. *In blank 31f* the grooves 91 are overhung by portions 95 and 97 of the fingers 61.

Figure 2F:
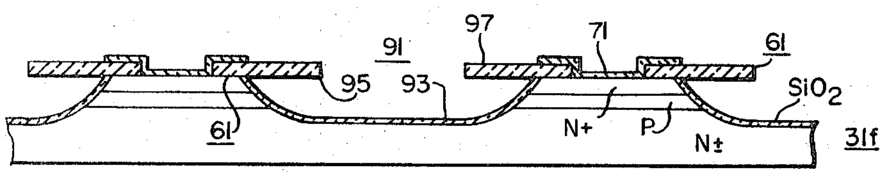
Figure 2G:
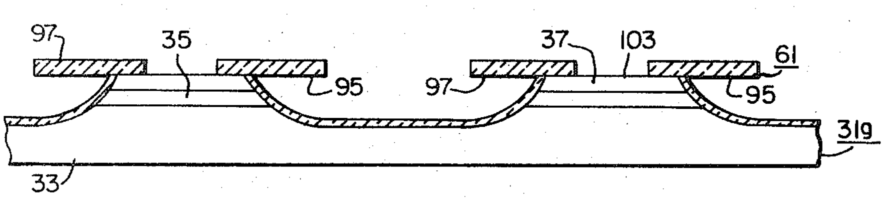

In step 6 the $Si_3N_4$ 71 is etched producing blank 31*g* from 31*f* (FIG. 2F). In blank 31*g* clean contact surfaces 103 for the drain electrodes are exposed for each finger 61.

In step 7 blank 31h is produced from blank 31*g*. The gates 111 are deposited under the alternate overhangs 95 by linear metal-vapor streams projected at an appropriate angle to the surfaces of the overhangs 95 and 97. Simultaneously the surface of each transistor, including the drain tab D and the gate tab G, are provided with a conducting coating 113.

Figure 2H:
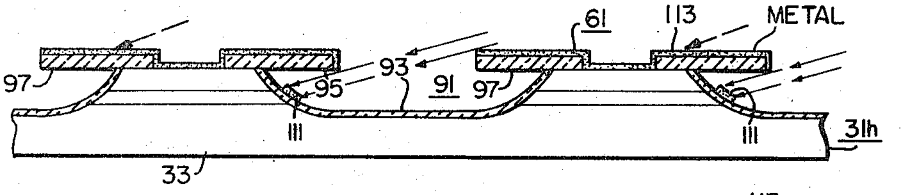
Figure 2I:
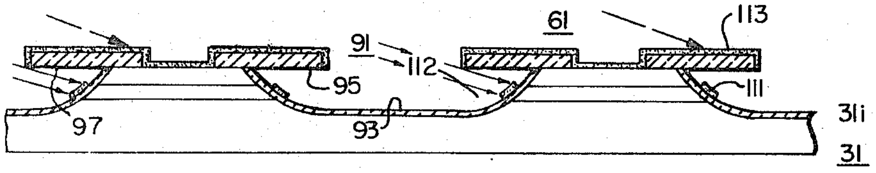

In step 8 blank 31*i* is produced from 31*h* (FIG. 2I). The gates 112 are deposited under the overhangs 97 by linear metal-vapor streams projected at an angle which is the supplement of the angle of step 7. An additional layer of metal is deposited on the surface 113 during this step 8 increasing its electrical conductivity.

Figures 5A, 5B, 6:
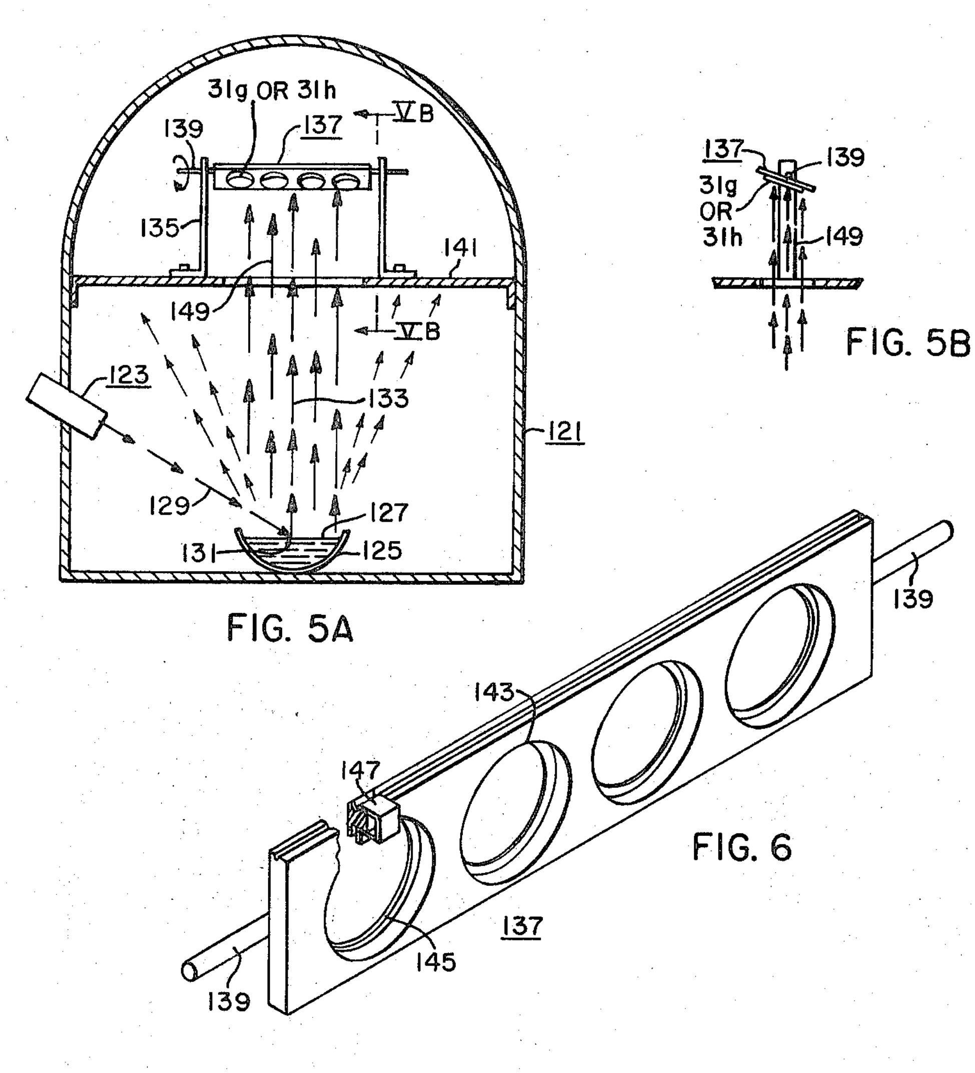
FIG. 5A is a diagrammatic view showing the apparatus for projecting a linear beam of vapor on the processed blanks in the practice of this invention.
FIG. 5B is a fragmental diagrammatic side view, taken along the lines VB—VB of FIG. 5A, showing how the vapor is projected on the blanks.
FIG. 6 is a view in perspective showing the bracket in which the wafers are supported during the coating operation.

The conducting coatings 113 and the gates 111 and 112 are deposited with the apparatus shown in FIGS. 5A, 5B and 6. This apparatus includes an evacuated enclosure 121. Within the enclosure 121 there is an appropriately energized (supply not shown) electron-beam generator 123. There is also in the chamber 121 a crucible 125 containing the coating material 127. The electron beam 129 impinges on the material 127 producing a substantially point source 131 of vapor of the coating material. The vapor radiates from the source 131 in linear streams 133. Within the chamber 121 there is also a bracket 135 of generally U cross-section on which another bracket 137 (FIG. 6), carrying the blanks 31*g* or 31*h* is supported. The bracket 137 has a bearing pin 139 (FIG. 6) and is supported on the pin 139 rotatable on bearings (not shown) in bracket 135. The bracket 135 is mounted on an aperture plate 141 having an aperture for collimating the linear vapor stream 133. The bracket 137 includes a plurality of receptacles 143 for the blanks 31*g* or 31*h*. Each receptacle has a lip 145 in which a blank 31*g* or 31*h* is seated and a clip 147 for clamping the blank. The blanks 31*g* or 31*h* are set in the proper angular position so that the collimated beam 149 is at the proper angle to the surfaces of the overhangs 95 and 97, as shown in FIG. 5B, by rotation of the pin 139.

Typically the metal which forms the gates 111 and 112 (FIGS. 2H and 2I) and the coating 113 comprises a thin coating of titanium or chromium covered with a substantially thicker coating of gold. The gates and coating may also be composed of aluminum. Other metals typically platinum, paladium etc. could be used.

Figure 11:
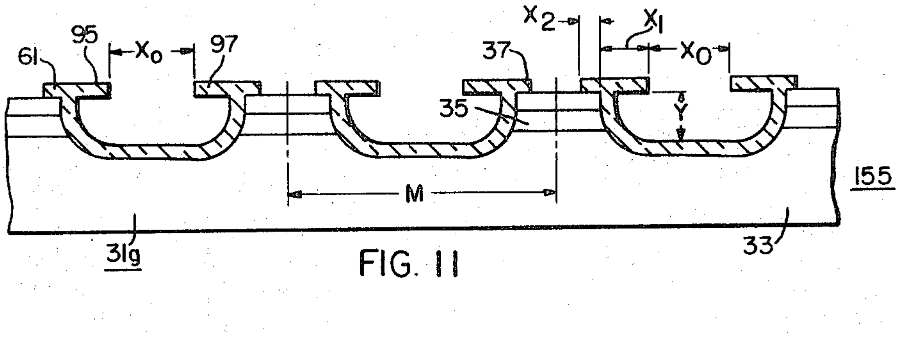
FIG. 11 is a diagrammatic fragmental view in section of part of a transistor produced in the practice of this invention showing the relationship of the various critical dimensions of the elements of the transistor.

Before the gates 111, 112 and the coating 113 are deposited, the parameters $x_0$, $x_1$, $x_2$ and $y$ shown in FIG. 11 are measured. The angle $\theta$ at which the linear beam is projected depends on the desired length L of the gates 111 and 112. L is equal to $x_0 \tan \theta$.

$$\theta \sim \tan^{-1}(L/x_0)$$

The desired length L is the projection of the end of the first layer 35 on the surface of the silicon-oxide coating 93. Typically the angle is about 20°. Tan 20° is about 0.36.

Figure 7:
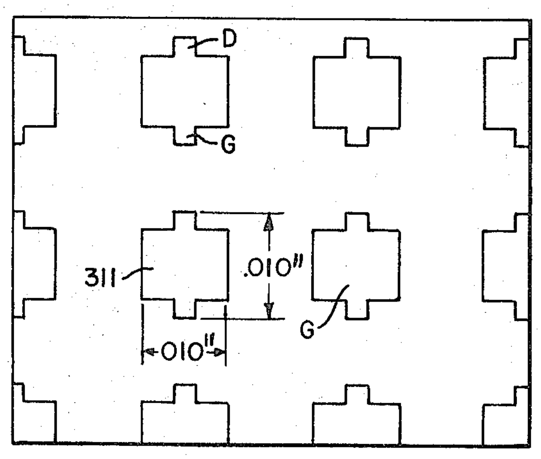
FIG. 7 is a plan view of a small portion of a wafer which has been processed in the practice of this invention.
Figure 8:
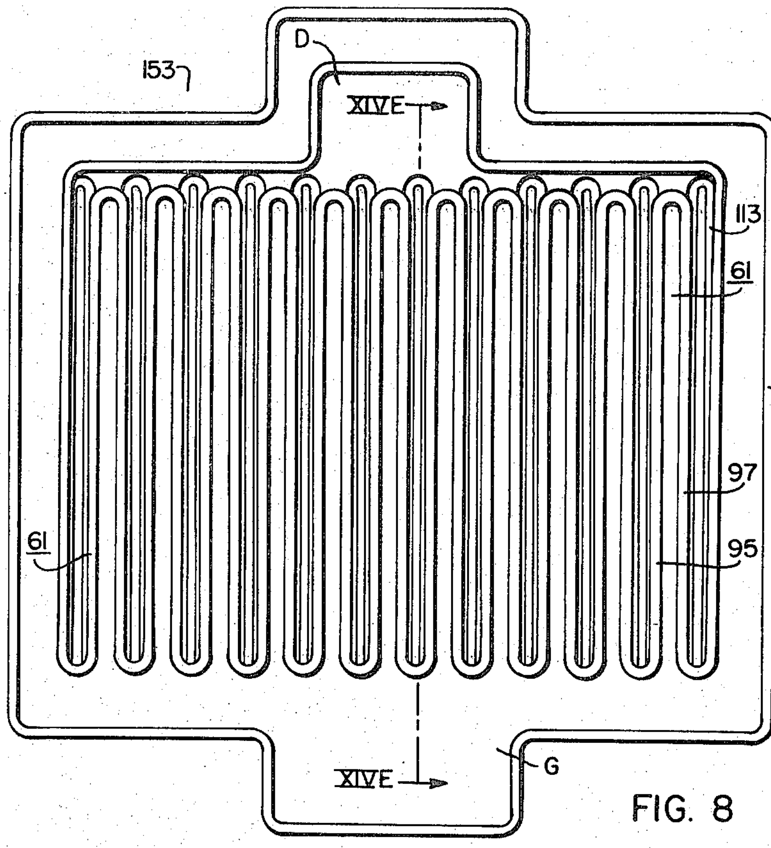
FIG. 8 is a plan view of a MOSFET produced in the practice of this invention.

FIG. 7 shows a square section of the blank or wafer 31*i* including the dimensions of each transistor and the distance between the centers of adjacent transistors.

These dimensions are presented only for the purpose of aiding those skilled in the art in practicing this invention. On the basis of the dimensions shown in FIG. 7, about 2,000 to 2,500 transistors, each consisting of 10–20 modules (fingers), can be derived from a 1 square inch area blank taking into consideration attrition by reason of the circular form of the blank and margins and the like.

Table I below presents the actual procedure followed in converting the blank 31 into the slice or blank 31*i* shown in FIG. 7.

TABLE I

| Step | Process | Special Instructions, Measurements, etc. |
|---|---|---|
| 0 | | Oxidize second layer 37 to 4500 A. |
| 1 | Oxidize MASK FIG. 3*a* | Spin 2:1 Waycoat (5000 rpm); 10 min. Prebake 90°C Expose , sec; 10 min. Postback 165°C. |
| 2 | $SiO_2$ Etch | Etch $SiO_2$ 4 min. Strip Photoresist. |
| 3 | $Si_3N_4 + SiO_2$ | Deposit 1000 A $Si_3N_4$ and 1300 A $SiO_2$. |
| 4 | MASK FIG. 3B | Spin Waycoat (3500 rpm) for HIGH RESOLUTION 2:1; Align mask. See-through cover fingers completely over whole slice if possible. |
| 5 | $SiO_2$ Etch | Etch 1300 A. Strip Photoresist. |
| 6 | $Si_3N_4$ Etch | Etch 1000 A $Si_3N_4$ (20 min. at 180°C) |
| 7 | Si Etch | Etch 60 sec. 25:10:1. Additional Etch time: ______ |
| 8 | $SiO_2$ Etch | Etch remnant $SiO_2$ covering $Si_3N_4$ with buffered HF; 10 sec. only. |
| 9 | Thermal Oxide | Grow 900 A $SiO_2$ (1100°C Furnace) (1 min. dry; 2 min. 50 sec.: 1 min. D wet). *Use timer on wet cycle. (no boiling acid, solvent, or ultrasonic; use only hot solutions). |
| 10 | $Si_3N_4$ Etch | Etch 1000 A $Si_3N_4$ (20 min. at 180°C) (center of fingers should be white, i.e. Si, when all $Si_3N_4$ is etched off). |
| 11 | Si Etch | Mount slice on quartz. Mask rim with Apiezon wax. Dip 1 min. buffered HF Etch Si back to__*DO NOT PRESS SLICE HARD AGAINST QUARTZ. |
| 12 | Measurement | Measure physical dimensions: $x_0$ ______ $x_1$ ______ $x_2$ ______ y ______ |
| 13 | Metal Deposition | Solvent clean in hot TCE; Acetone DI; Blow dry. (NO boiling or ultrasonic or HF process!) |
| 14 | | Mount slice on rotating jig at +______ to horizontal. Evaporate. |
| 15 | | Rotate slice to −__to horizontal. Evaporate |
| 16 | | Rotate slice to metallize back |
| 17 | $H_2$ Anneal | $H_2$ anneal at 350°C, 45 min. |

Table I includes operations not described in the general description above. "Waycoat" (Steps 1 and 4) is the name of the Eastman Kodak negative photoresist which is used. Two parts of Waycoat are mixed with one part of thinner. In Step 4 the Waycoat is spun at a lower speed than in Step 1 because a thicker layer is required to achieve masking integrity. The $SiO_2$ is etched with hydrofluoric acid or buffered hydrofluoric acid as in Step 8. Buffered hydrofluoric acid is a solution of six parts $NH_3F$ and one part HF. The $Si_3N_4$ (for example Step 6) is etched in phosphoric acid. The S*i* (Step 7) is etched in a solution of 25 parts $HNO_3$, 10 parts $HC_2H_3O_2$, and one part HF. The HF also removes S*i*$O_2$. The attendant writes in the blank, the additional time of etching necessary to achieve the desired depth of the groove 91. This information is necessary for future use. Step 8 is necessary to remove the remnant of S*i*$O_2$ so that the resulting surfaces are clean. To grow S*i*$O_2$ (Step 9) the slice is subjected to dry oxygen for 1 minute and steam mixed with oxygen for 2 min. 50 seconds., then again for 1 minute with dry oxygen. In Step 11 the attendant writes in the blank lines the thickness of the Si. In step 12 the attendant writes in the blank lines dimensions $x_0$, $x_1$, $x_2$, $y$. In Steps 14 and 15, the attendant writes in the blank lines the necessary angles of rotation of the bracket 137. In Step 16 the back of the slice 31i is metallized with the same metal or combinations of metals as the front of the slice.

The transistors in the slice 31*i* are MOSFETs with multiple parallel elements. After the back of the slice is metallized (Steps 16, 17), the electrical characteristics of random samples are checked. In each case the following are determined:

1. Voltage current characteristics (V–I);
2. Interelectrode capacities (CV);
3. Transconductance $g_m$.

At this point the slice 31*i* has a thickness of about 0.010 inch. The slice is now mounted face-down on quartz, the mounting sealed with Apiezon wax, the back metallization removed, and the slice is etched down to 0.002 inch except for a narrow rim around its periphery which remains at 0.010 inch.

The slice is now removed from the quartz and thoroughly cleaned of the wax. The back is again metallized with the coatings used on the front face to about 2,000 A.

The resulting slice is again mounted face-down in quartz and the rim etched off. The whole slice is now 0.002 inch thick. The purpose of the rim is to lend stiffness to the slice and prevent its shattering during the coating of the back.

The back of the resulting slice is now coated with negative photoresist and exposed through mask 151. After development of the slice, the exposed areas, that is, the areas which were covered by the squares 153, are covered with about 0.002 to 0.003 inch gold or copper which serves as heat sink (154 FIG. 14E). The individual elements or modules are then cut outwith a diamond saw.

Figure 9:
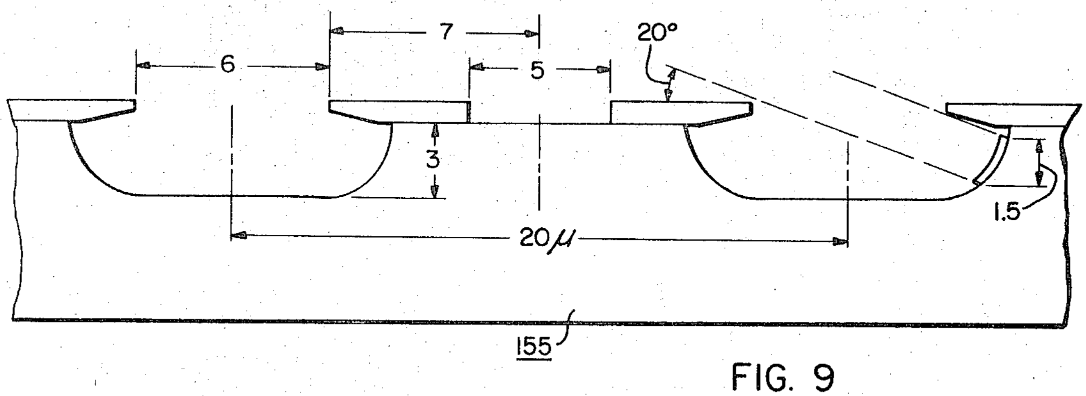
FIG. 9 is a fragmental diagrammatic view showing the dimensions of the elements of a transistor produced in the practice of this invention.

FIG. 9 shows the actual dimensions in microns of each element or module 155 of a typical MOSFET made in the practice of this invention. The distance labeled M in FIG. 11 is 20 microns.

Figure 12:
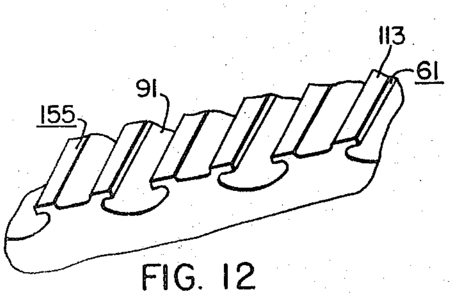
FIG. 12 is a copy of an electron-microscope photograph of several transistor elements produced in the practice of this invention.
Figure 13:
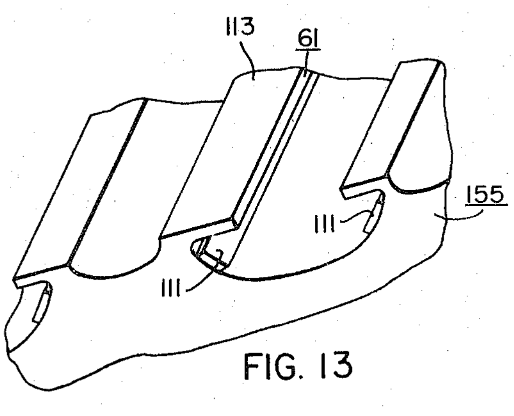
FIG. 13 is a copy of an enlarged electron-microscope photograph showing one of the elements or modules shown in FIG. 12.

FIGS. 12 and 13 show a photograph of several elements 155 of a transistor produced in the practice of this invention. The gate 111 (FIG. 13) is 1.8 microns in actual dimension. It is emphasized that gates 111 are sharply defined with no penumbra effect.

Figure 10:
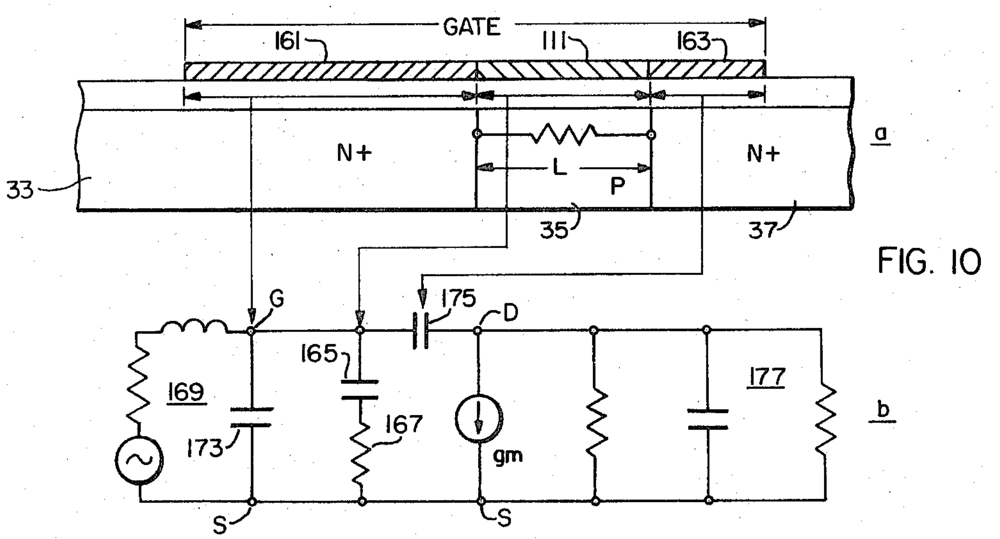
FIGS. 10a and b show the relationship between the parts of a transistor element produced in the practice of this invention and the equivalent circuit.

FIGS. 10*a* and *b* permit comparison between the electrical effect of a gate 111–112 of length L approximately equal to the projection, in the groove 91, of the end of the P layer 35 and a longer gate having parts 161 and 163 extending over the projections of the ends of substrate 33 and layer 37. The gate 111–112 produces a capacitance 165 and resistance 167 in series across the gate G and the source S where the input 169 is impressed. These components are relatively small. The gate portion 161, being longer than the gate 111–112, produces a larger capacitance 173 between the gate G and source S which materially reduces the frequency over which the transistor can operate. The gate portion 163 adds a feedback capacitance 175, between the drain D and the gate G, from the output 177 to the input 169 deteriorating the stability of the transistor at higher frequencies since the feedback impedance is $1/j\omega c$ (C is 175). In transistors produced in the practice of this invention capacitors 173 and 175 are reduced to negligible magnitudes because, as shown in FIG. 13, there is no penumbra effect producing capacity betwen the gate 111–112 and either substrate 35 or layer 37.

Figure 14A:
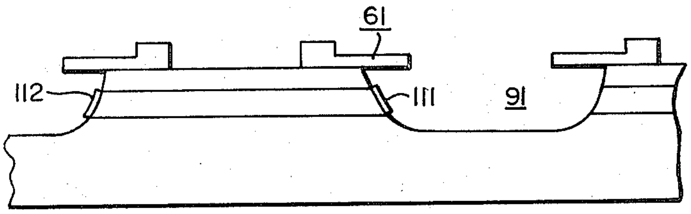
FIG. 14A is a fragmental view, enlarged, in side elevation, of a part of a transistor produced in the practice of this invention.
Figure 14B:
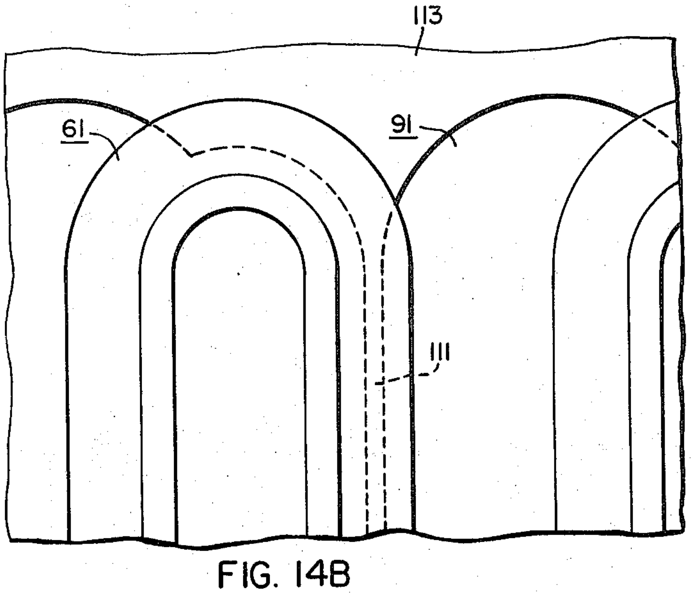
FIG. 14B is a fragmental plan view of the part shown in FIG. 14A.
Figure 14C:
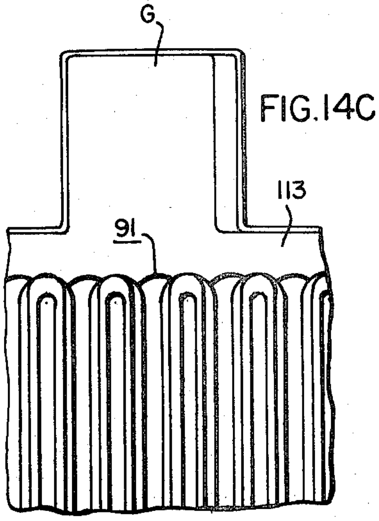
FIG. 14C is a fragmental plane view enlarged showing a part of a transistor produced in the practice of this invention near the gate terminal pad.
Figure 14D:
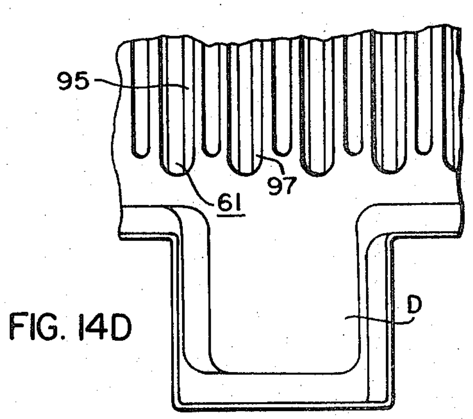
FIG. 14D is a like plan view showing the same part of the transistor near the drain terminal pad.
Figure 14E:
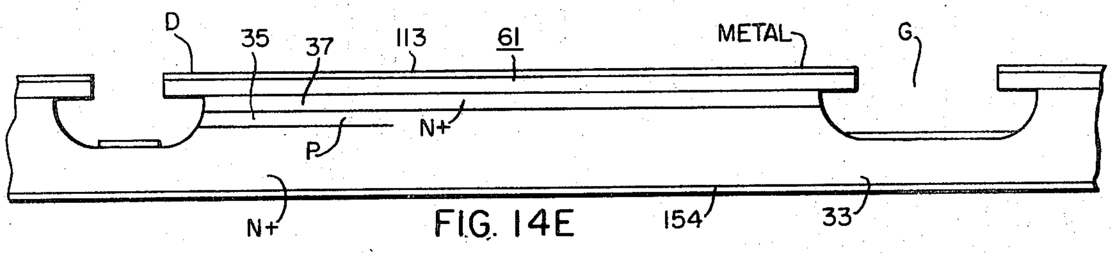
FIG. 14E is a view in section taken along line XIVE–XIVE of FIG. 8.

In apparatus produced in accordance with this invention, all gate leads are connected together at the gate pad G. This structure is illustrated in FIGS. 14A through 14D particularly FIG. 14B for a one-sided gate 111 for clarity. At the gate G, all gates are connected together, all merging into the pad G. This pad G is typically about 0.002 inch × 0.002 inch in area. It is this close packing of device function which permits very high transistor power with very small transistor areas. The grooves 91 and the gate pad G are etched to a lower level (FIG. 14E) than the drain pad D (FIG. 14D). Because of the difference in level and because of the shading of the overhangs 95 and 97, the deposit of the gates 111–112 and the coatings 113 does not cause the drain pad D to be connected to the gates 111 and 112 and the gates 111 and 112 are insulated from the deposit on the drain pad D.

The MOSFET produced in the practice of this invention has marked advantages over the prior art transistors. Geometrically, the use of a "vertical" channel provides a very high active-periphery-to-output-area ratio, in this case typically over 0.5 cm. of active periphery for only 0.006 square inch of output area. This feature is important in obtaining high output cut-off frequency since the transconductance of the device is proportional to active periphery while the output capacitance is proportional to output area.

Another advantage of this vertical MOSFET is its relative high input impedance, for example, for 5 watt 4 GHZ operation. The input Z of a bipolar transistor is about:

$$Z = (kT/qI)\ \beta$$

where $k$ is Boltzman's constant, T the temperature in degrees Kelvin, $q$ the charge on an electron, I the quiescent current and $\beta$ the current gain of the transistor. For a FET, Z is about $E_G/I$ where $E_G$ is the forbidden quantum bandgap of the semiconductor. In both cases, I is the quiescent current of the device, about the same in both types of devices assuming the same output power and same breakdown voltage at a given epitaxial width. Thus the FET has a higher input Z by a factor of $qE_G/\beta kT$, which is about a factor of 10 advantage at the same output power. With good circuit engineering this can be immediately transformed into a factor of ten greater bandwidth at the same output power level.

Some additional technological advantages of the "vertical" FET are (1) the channel length is epitaxially controlled, permitting 0.25 to 0.5 micron resolution, (2) expensive silicon-on-sapphire is not needed to reduce output parasitics due to the close packing of active function in the proposed geometry, and (3) the device has naturally a common-source configuration which operates well with strip-line circuitry. There are, in addition, some other advantages of the basic FET structure, for example: (1) the FET's, suffer less from second breakdown problems than bipolars, thus permitting linear class A operation, and (2) FETs have been shown to have lower noise performance than bipolars.

Calculations presented in Reference 10 indicate that a good operational figure-of-merit for any power transistor geometry is $I_{max}/2\pi C_{out}$. For both bipolars and FETs it can be shown that, using this figure-of-merit, one obtains [power out $x$ impedance out]$^{1/2}$ × frequency cut-off $$= 125\ \text{(active periphery/output area)} \qquad (1)$$

in (microns/square micron).

Figure 15A:
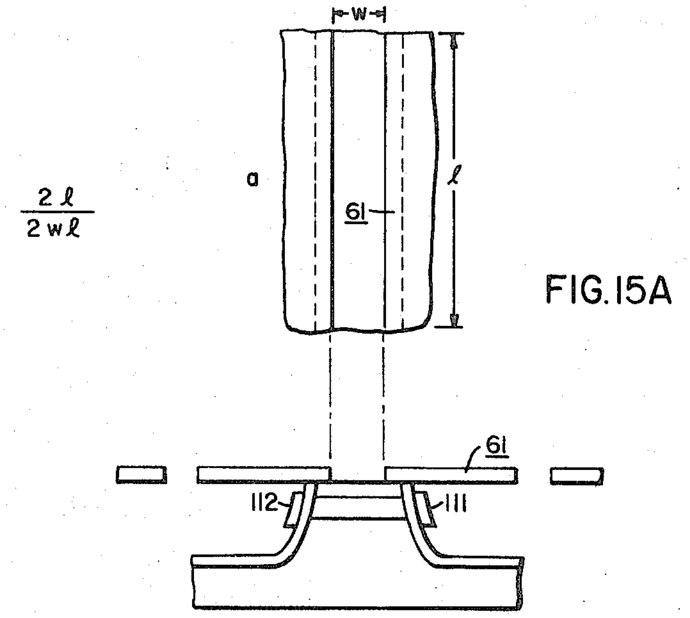
FIGS. 15A, B, C, D are diagrammatic views for comparing the figure-of-merit for a bipolar transistor with that of a "vertical" FET produced in the practice of this invention.
Figure 15B:
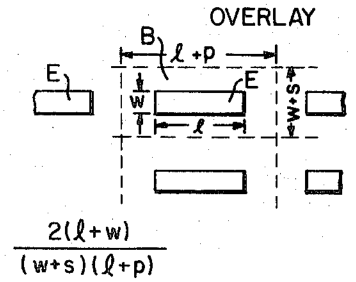
Figure 15C:
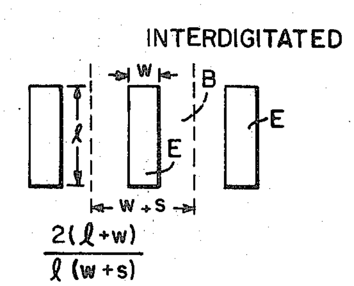
Figure 15D:
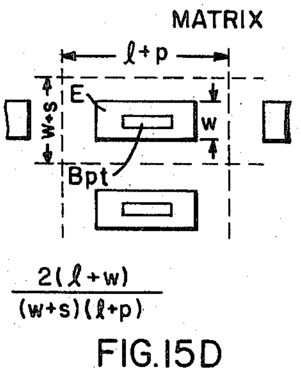

In FIGS. 15A, B, C, D, an FET according to this invention (FIG. 15A) is compared, as to figure-of-merit BP/BA with an overlay bipolar transistor (FIG. 15B), an interdigitated bipolar transistor (FIG. 15C) and a matrix transistor. In the case of the bipolar transistors the emitter is labeled E and the base B. The critical dimensions which are compared are shown. Because the output area of the FET is equal to or smaller than the area in the plane of the FET bounded by the vertically emitting periphery, while in all three types of bipolars the converse is true, the result is that the factor (active periphery/output area) is always greater than for a bipolar for the same photoresist minimum line resolution. In case of the FET according to this invention, about a factor of 4 in favor of the FET exists.

Figure 16:
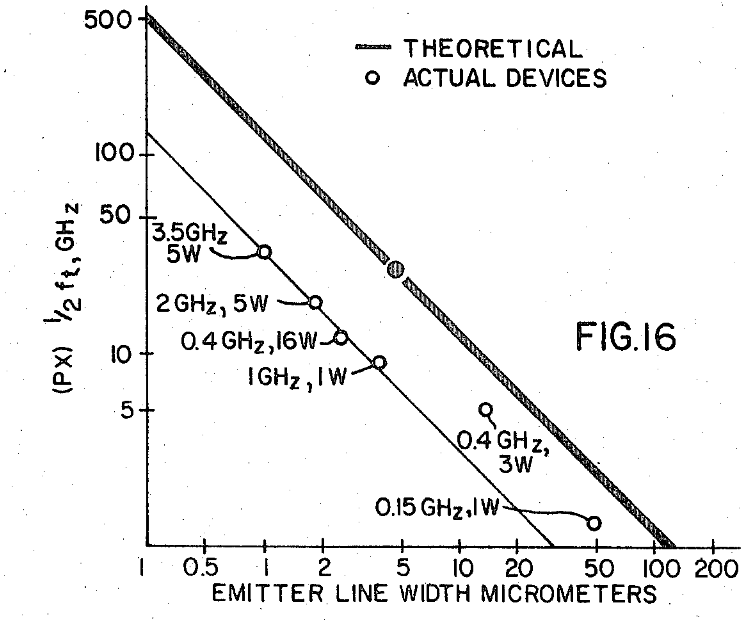
FIG. 16 is a graph showing the relationship of the merit-figures of an overlay bipolar transistor and a transistor produced in the practice of this invention.

In FIG. 16 an overlay bipolar transistor is compared graphically with an MOSFET according to this invention. The product of the square root of the product of output power and output reactance by frequency are plotted vertically and emitter line width horizontally. Both scales are logarithmic. The thin line presents the relationship for the bipolar transistor and is derived from Reference 10. The thin line is derived theoretically; actual points are represented by small circles. The heavy line presents the superior relationship of the MOSFET according to this invention.

Figure 17:
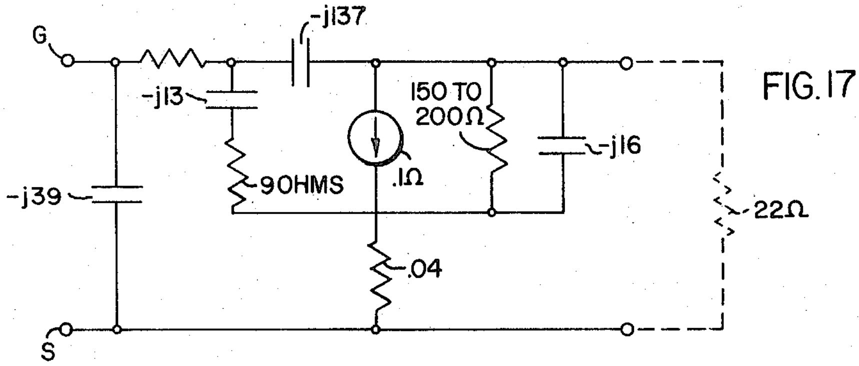
FIG. 17 is the equivalent circuit for a "vertical" MOSFET produced in the practice of this invention showing the magnitudes of the equivalent components.

The circuit shown in FIG. 17 presents the results of a computer analysis of the MOSFET produced in the practice of this invention. The capacitance are computed as impedances in ohms.

FIG. 17 is essentially the theoretical equivalent circuit for a 5 watt class A linear power amplifier using the "vertical" geometry of this invention. Capacitive impedances are calculated at 4 GHZ. The high input and output impedances obtainable at 4 GHZ and at 5 watts are of interest. These high impedances coupled with the high power output and small size of this FET render it ideal for radar applications.

Figure 18:
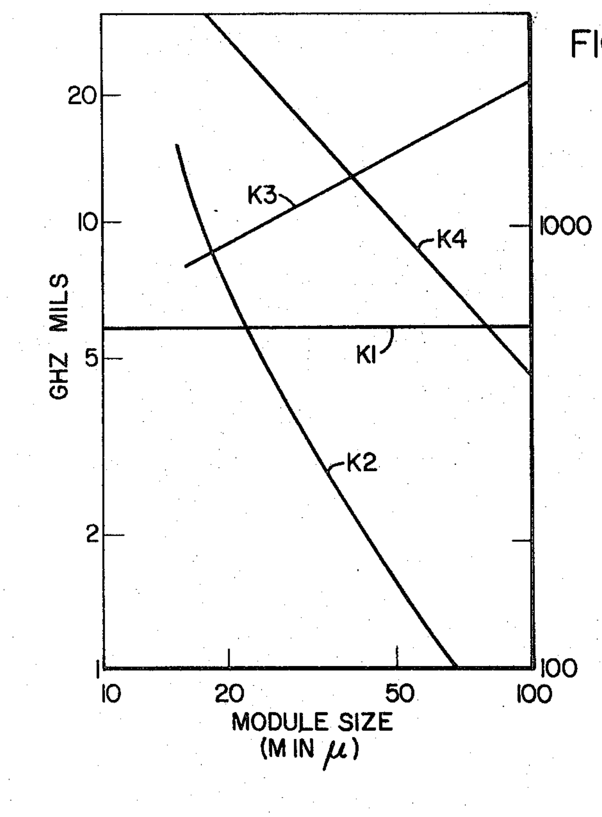
FIGS. 18 through 22 are graphs illustrating the operation of a transistor produced in the practice of this invention.

FIG. 18 presents features of the MOSFET produced in the practice of this invention. In FIG. 18 the module or element 155 size, using M (FIG. 11) as a measure, is plotted horizontally. On the left frequency in GHZ and length of the side of a square FET, the product of M by the number of modules, in mils are plotted vertically and on the right current density is plotted vertically. Curve K1 presents the input frequency as a function of M, curve K2 the cut-off output frequency, curve K3 the length of the side of an FET, and curve K4 the current density.

FIG. 18 shows that unless the module size, M, of the FET is below 20 microns, the output cutoff frequency of the device is adversely effected. Curve K2 shows that the cut-off output frequency is equal to, or exceeds, the input frequency for M equal to about 20 microns or less.

Figure 19:
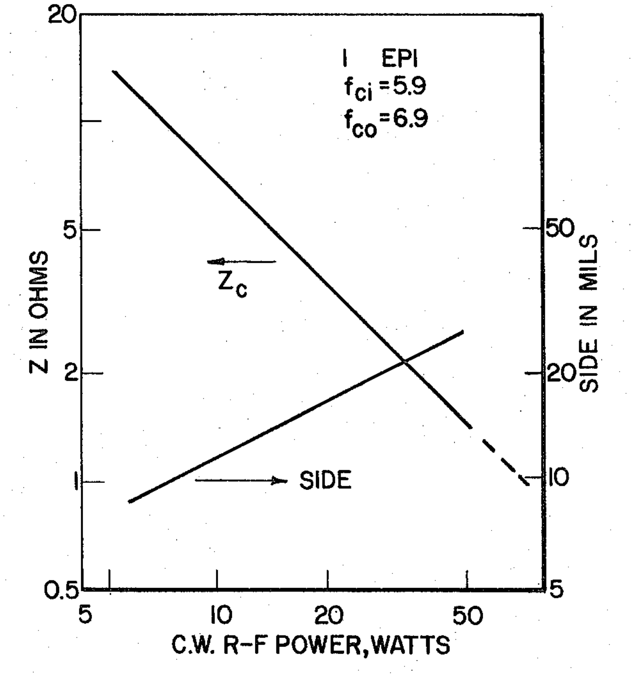

The extrapolated theoretical power capability of the MOSFET according to this invention is shown in FIG. 19. Power is plotted horizontally. Vertically, on the left, impedance Z is plotted, and on the right, length of the transistor assumed to be square (product of M by number of modules) is plotted. For an input impedance level of 4 ohms for example, output powers in excess of 20 watts at 4 GHZ in a module measuring 0.018 inch × 0.018 inch, is attainable with this MOSFET. The temperature rise at this power level is still within the limit of reliable operation.

Figure 20:
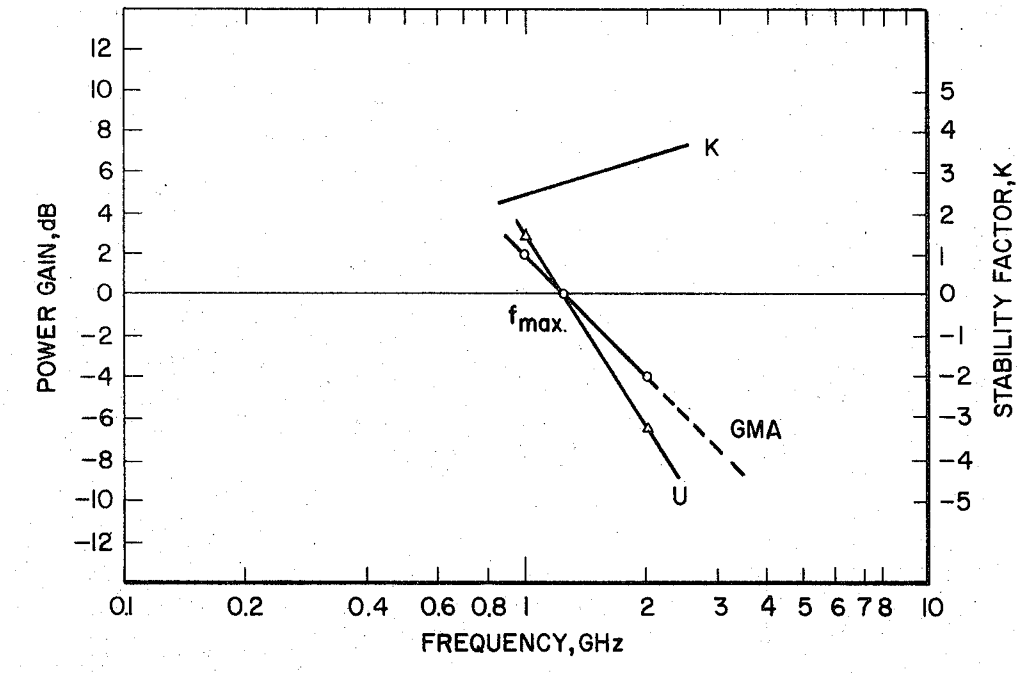
Figure 22:
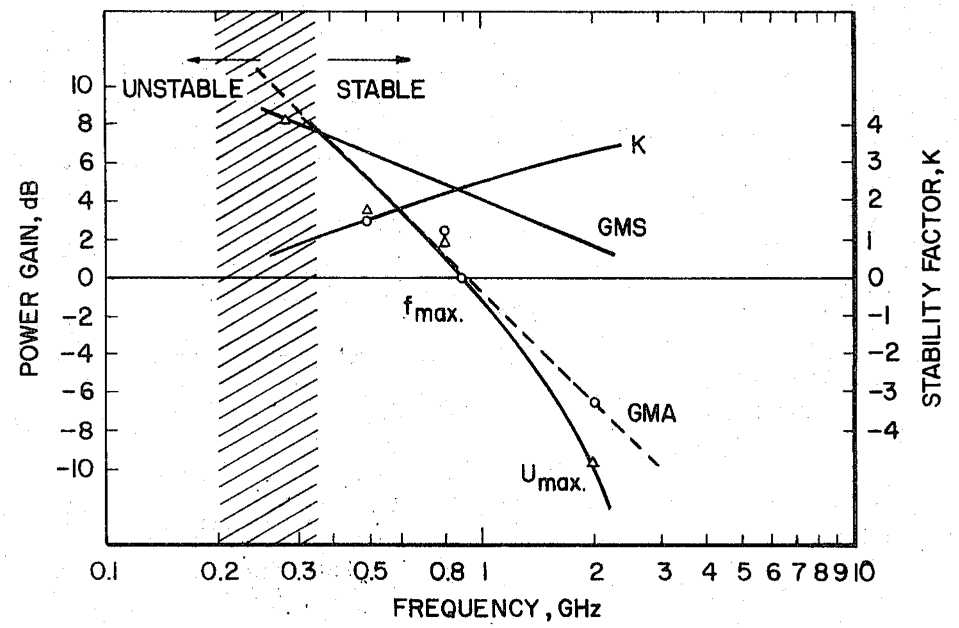
Figure 21:
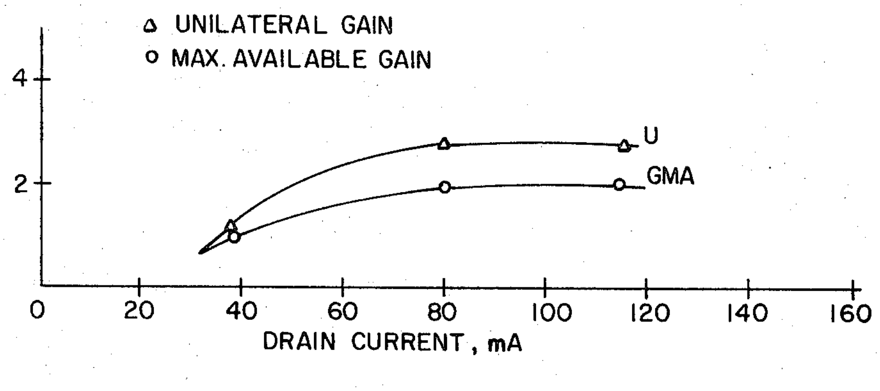
Figure 23A:
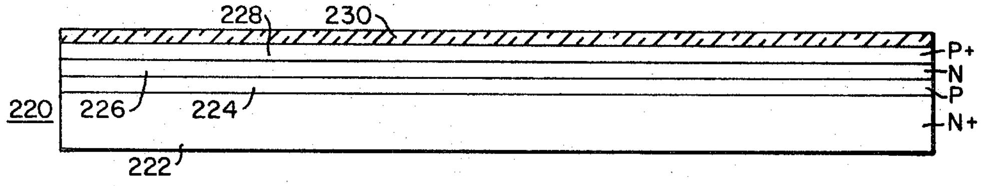
FIGS. 23 A, B, C, D, E, together are is a diagrammatic view of the making of a transistor in accordance with a modification of this invention.
Figure 23B:
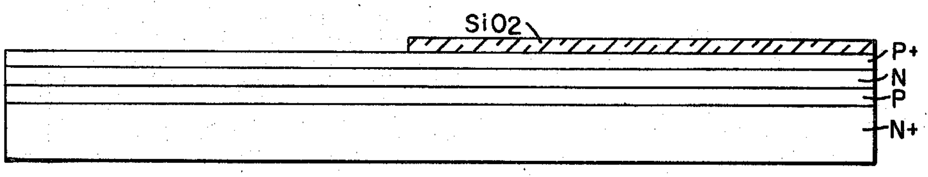
Figure 23C:
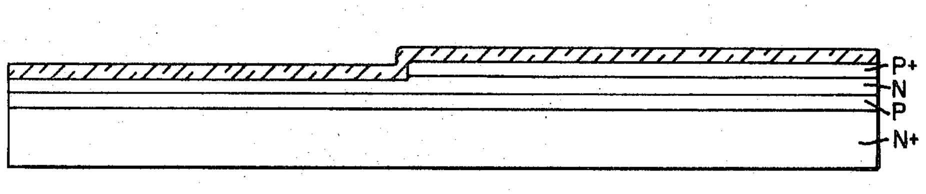
Figure 23D:
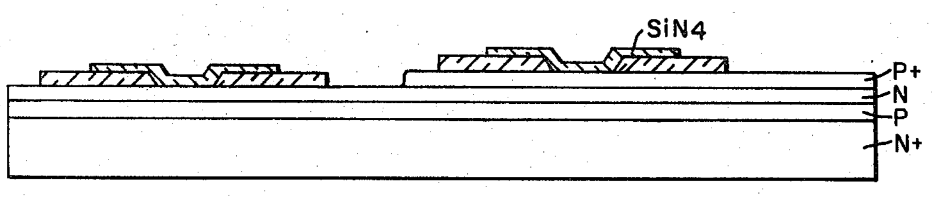
Figure 23E:
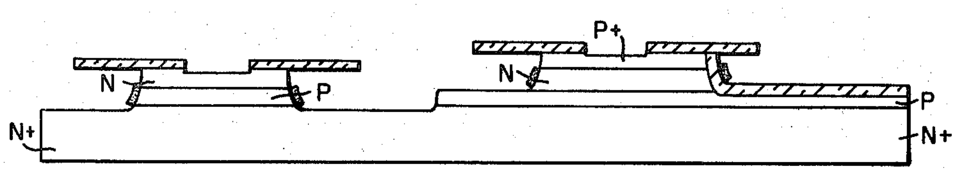

FIGS. 20, 21 and 22 show graphically properties of the transistor (MOSFET) according to this invention obtained from experimental work with this transistor. In FIG. 20, frequency is plotted horizontally on a logarithmic scale. Vertically, power gain is plotted on the left and the stability constant, K, on the right. FIG. 20 is based on operation with the following parameters.

Drain voltage $V_D = 2$ volts;

Drain current $I_D = 80$ mA;

Gate voltage $V_G = 4.5$ volts.

The curve labeled GMA presents the maximum available gain as a function of frequency and the curve labeled U gives the unilateral gain as a function of frequency.

In FIG. 21, gain, plotted vertically, is presented as a function of drain current, plotted horizontally at 1 GHZ.

In FIG. 22 frequency is plotted horizontally on a logarithmic scale. Vertically, gain is plotted on the left and stability factor on the right. The following parameters were used in apparatus which was operated to obtain the curves:

$V_D = 2.5$ volts;

$I_D = 40$ mA;

$V_G = 4.5$ volts.

The shaded area of the curve is the region where the MOSFET tends to become unstable. In this region, K approaches 1 and decreases below 1. To the left of this region the operation is unstable. The curve labeled GMS presents the maximum stable gain as a function of frequency.

The MOSFET with the angularly evaporated gate of this invention has shown itself to deliver microwave power at high frequency with high input impedance. Its figure-of-merit in the $Pf^2Z$ domain using practical current limitations as criteria indicates that performance may exceed the bipolar transistor in the realm of power amplification. In all respects, i.e., noise, cost, insensitivity to second-breakdown, class A operation, high input impedance, and insensitivity to high energy radiation, the MOSFET according to this invention has significant advantages for radar-based system work.

FIGS. 23 A through E show the basic structure according to this invention wherein NPN and PNP transistors are produced in the same wafer 220. The wafer 220 is formed of four layers 222, 224, 226, 228 having carriers as indicated. The wafer 220 is coated with an $SiO_2$ layer 230, part of which is removed in step b (FIG. 23B). The thus modified wafer is treated as shown in FIG. 2 and as indicated in FIGS. 23C, D, E.

While preferred practice and a preferred embodiment of this invention has been disclosed herein, many modifications thereof are feasible. This invention is not to be restricted except insofar as is necessitated by the prior art.

I claim:

1. The method of producing from a blank a field-effect transistor (FET), capable of operating at microwave frequencies and of handling substantial power at said frequencies, the said blank having a substrate doped with carriers of a first polarity and having a first layer thereon doped with carriers of opposite polarity, said first layer having a second layer thereon doped with carriers of said first polarity, the said method comprising preparing on said second layer a pair of spaced regions, at least one of said regions having a surface for deposit thereon of a drain electrode, forming a groove in said blank between said prepared regions, each of said regions overhanging said groove a predetermined distance, said groove penetrating to said substrate, depositing a coating of an electrically insulating material on the surface of said groove, depositing a gate electrode on said coating by projecting, on the part of said coating under said one region, a linear beam of a metal vapor at an angle to said surface from that direction of the region of the pair other than said one region and permitting said vapor to solidify, adjacent to and under the overhang of said one region, said beam being shadowed by said overhangs of said regions so that said gate electrode is deposited substantially only opposite the edge of said first layer extending along said groove; and depositing said drain electrode on said surface.

2. The method of claim 1 for producing a metal-oxide silicon field-effect transistor (MOSFET) from a blank including a substrate of silicon doped with carriers of a first polarity having thereon a first layer of silicon doped with carriers of opposite polarity, said second layer having thereon a layer of silicon doped with carriers of said first polarity, the said method including the steps:

a. depositing a coating of silicon dioxide on said second layer;
b. removing the silicon dioxide from selected areas of said second layer leaving at least a first pair of strips of silicon dioxide and a second pair of strips of silicon dioxide, strips of exposed second layer extending between the dioxide strips of each pair and between said pairs;
c. depositing a coating of silicon nitride on said second layer and on said pairs of strips of said dioxide;
d. depositing a coating of silicon dioxide throughout on said coating of silicon nitride;
e. masking the silicon dioxide coating between the strips of each pair and removing the exposed silicon dioxide and silicon nitride;
f. producing a groove between the adjacent strips of dioxide of the pairs by removing the material between the pairs of strips of dioxide down to the substrate, undercutting the adjacent strips of dioxide of the pairs so that said adjacent strips overhang the groove followed by oxidation of exposed silicon to produce a coating of silicon dioxide;
g. removing the silicon nitride from the oxide strips;
h. depositing an electrically conductive coating on the strips of each pair and on the portion of the second layer between the strips of each pair thus forming the drain electrodes; and
j. projecting the linear beam of a metal vapor at an angle to the surfaces of at least one pair of said strips to form the gate electrode within the groove adjacent the other set of said strips, said beam being shadowed by the overhangs of said strips so that said gate electrode is deposited substantially only opposite the edge of said first layer extending along said groove.

3. The method of claim 1 wherein the linear beam of metal vapor, which deposits the gate electrode, simultaneously deposits the drain electrode.

4. The method of claim 2 wherein the linear beam of metal which deposits the gate electrode simultaneously deposits the drain electrode.

5. The method of claim 1 wherein a plurality of spaced regions are prepared on said second layer, each region having a surface for deposit of a drain electrode, and wherein a plurality of grooves are formed between the adjacent ends of successive pairs of spaced regions, each groove being overhung a predetermined distance by the spaced regions between which it is formed, and wherein the linear beam of vapor is first projected at an angle $\theta$ to the surfaces of said regions to deposit gate electrodes under the alternate overhangs which extends towards the direction from which the beam is projected, and thereafter the beam is projected at an angle of about $180°-\theta$ to the surfaces of said regions to deposit gate electrodes under the alternate overhangs which extend towards the direction from which the last-named beam projects.

6. The method of claim 5 wherein the linear beams deposit the drain electrodes simultaneously with the gate electrodes whereby the drain electrodes are of low electrical conductivity.

7. The method of producing from a blank a field-effect transistor capable of operating at microwave frequencies and of handling substantial power at said frequencies, the said blank including a first layer doped with carriers of a first polarity said first layer being interposed between an upper layer and a lower layer, said upper and lower layers being doped with carriers of opposite polarity, the said method comprising preparing on said upper layer of a pair of spaced regions, at least one of said regions having a surface for deposit therein of a drain electrode, forming a groove in said blank between said prepared regions, said groove extending between said regions, each of said regions overhanging said groove a predetermined distance, depositing a coating of an electrically insulating material on the surface of said groove, depositing a gate electrode on said coating by projecting, on the part of said coating under said one region, a linear beam of a metal vapor at an angle to said surface from the direction of that region of the pair of spaced regions other than said one region, and permitting said vapor to solidify, adjacent to and under the overhang of said one region, said beam being shadowed by said overhangs of said regions so that said gate electrode is deposited substantially only opposite the edge of said first layer extending along said groove; and depositing said drain electrode on the surface of said one region.

8. The method of producing, from a blank, a field-effect transistor capable of operating at microwave frequencies and of handling substantial power at said frequencies, the said blank including a first layer doped with carriers of a first polarity, said first layer being interposed between an upper layer and a lower layer, said upper and lower layers being doped with carriers of opposite polarity, the said method comprising, preparing on said upper layer a plurality of spaced regions, certain of said regions having surfaces thereon for deposit of drain electrodes, forming a groove each between successive of said spaced regions, each said groove penetrating at least through said first layer, each said groove being overhung (a) at least on one side by the surface of said region defining said last-named groove, (b) the grooves between successive layers merging at one end of said blank in a common depression generally transverse to said grooves, depositing a coating of electrically insulating material on the surface of each said groove, said coating extending over said first layer penetrating into said groove, depositing a gate electrode on said coating in said grooves by projecting on the surface of said blank a linear beam of a metal vapor at an angle to said surface from the direction opposite to said overhang (c) of each said groove, said beam penetrating under said (d) overhang on said one side of each said groove and depositing on the said coating under said overhang, and permitting said projected vapor on said coating to solidify, said vapor when depositing into each said groove being shadowed by said (e) overhang on one side and by the boundary of said last-named groove on the opposite side (f) so that the gate electrode under the overhang of said last-named groove is deposited substantially only on the coating opposite the edge of said first layer extending along said last-named groove; while depositing said gate electrodes also depositing said vapor in said depression and permitting said vapor in said depression to solidify, thereby providing an interconnecting terminal for said gates; and depositing said drain electrodes on said surface.

9. The method of producing, from a blank, a field-effect transistor capable of operating at microwave frequencies and of handling substantial power at said frequencies, the said blank including a first layer doped with carriers of a first polarity, said first layer being interposed between an upper layer and a lower layer, said upper and lower layers being doped with carriers of opposite polarity, the said method comprising, preparing on said upper layer a plurality of spaced regions, certain of said regions having surfaces thereon for deposit of drain electrodes, forming a groove each between successive of said spaced regions, each said groove penetrating at least through said first layer, each said groove being overhung (a) on both sides by the surface of the region defining, said last-named groove, (b) the grooves between successive layers merging at one end of said blank in a common depression generally transverse to said grooves, depositing a coating of electrically insulating material on the surface of each said groove, said coating extending over said first layer penetrating into said groove, depositing a gate electrode on said coating in said grooves by projecting on the surface of said blank a linear beam of a metal vapor at an angle to said surface from the direction opposite to said overhang (c) at least on one side of each said groove, said beam penetrating under said (d) last-named overhang on said one side of each said groove and depositing on the said coating under said overhang, and permitting said projected vapor in said coating to solidify, said vapor when depositing into each said groove being shadowed by said (e) overhangs on both sides of said last-named groove (f) so that the gate electrode under the overhang of said last-named groove is deposited substantially only in the coating opposite the edge of said first layer extending along said last-named groove; while depositing said gate electrodes also depositing said vapor in said depression and permitting said vapor in said depression to solidify, thereby providing an interconnecting terminal for said gates; and depositing said drain electrodes on said surface.

* * * * *